Dec. 10, 1935.  E. R. WILLIAMS  2,023,985
THERMAL INSULATION
Filed July 29, 1932
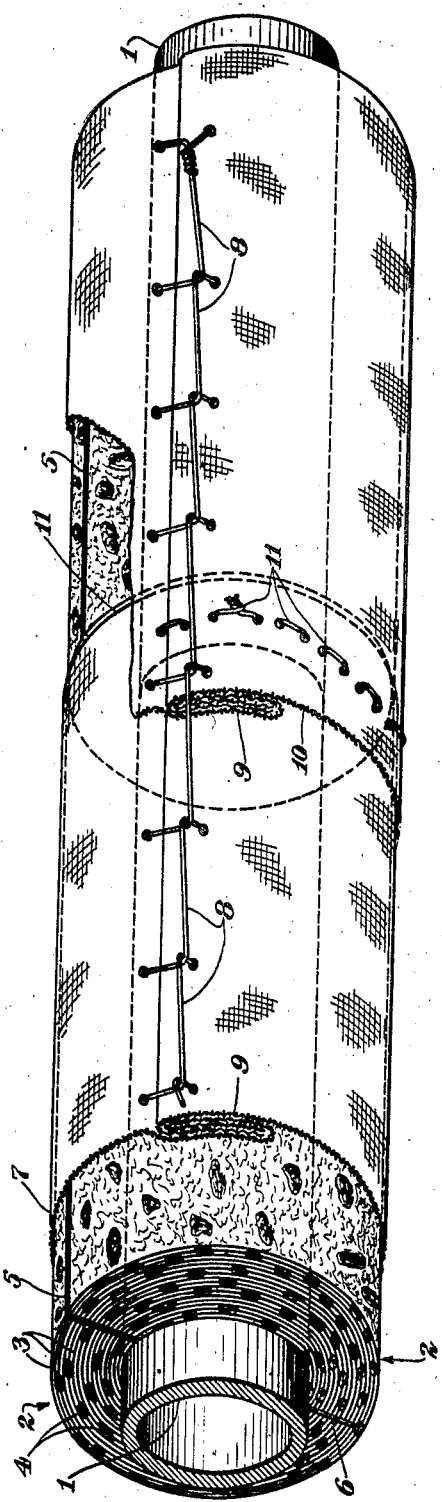
INVENTOR
*Earle R. Williams.*
BY *D. N. Halstead*
ATTORNEY Patented Dec. 10, 1935

2,023,985

UNITED STATES PATENT OFFICE 2,023,985

THERMAL INSULATION

Earle R. Williams, North Plainfield, N. J., assignor to Johns-Manville Corporation, New York, N. Y., a corporation of New York Application July 29, 1932, Serial No. 626,000

2 Claims. (Cl. 154—44)

This invention relates to thermal insulation and particularly to tubular, insulating pipe covering adapted to withstand alternate inundation by water and warming to a temperature at which steam is generated within the covering.

The invention comprises the combination of an underground steam conduit and tubular sectional pipe covering therefor, including a water-permeable, water-resistant insulating layer; a water-permeable, water-resistant, mildew-proof, wrapping and retaining member that is strong when wet; and permanent fastening means securing the wrapping and retaining member around the insulating layer.

Insulated underground steam pipes are very widely used. A conventional type of insulation for such conduits is one that is made as nearly waterproof as feasible, in order to exclude water that may be present around the pipe under conditions of flooding. However, it is not possible to exclude flood water with certainty. When such water gets within the pipe covering and is later converted in part to steam by the heat of the pipe, the steam so generated may blow the pipe covering away from the pipe, as the steam acts upon a relatively impermeable covering.

In attempting to solve this problem of long standing, I have adopted a structure which is based upon reasoning that is contrary to that used in designing conventional insulation. I have assumed that it is not possible to exclude all water from the pipe covering and have made provision whereby water that has soaked into the pipe covering may escape readily therefrom, either as liquid water or as steam, without disruption of the covering.

The invention is illustrated in the figure which shows a perspective view of a preferred embodiment of the invention, with parts broken away for clearness of illustration.

The figure shows a conduit 1, such as an underground steam pipe and adjoining sections 2 of tubular insulation, in position around the steam line.

The insulation includes sheets 3 of felted fibrous material, suitably asbestos paper. The various sheets may be spaced from each other by means of spacing particles 4. These spacing particles are suitably of such type as to offer a minimum of resistance to the passage of water through the insulating material and may have positive capillarity for water. For example, the spacing particles may consist of sponge or corn cob incorporated into the material composing the several sheets, as described in U. S. Patent 1,218,679, issued March 13, 1917, to Manville. Another type of tubular insulation comprising juxtaposed, spaced members is one in which sheets of indented paper are wound spirally upon each other, suitably alternating with paper of plane surface in order to avoid internesting of the indents on the several sheets of the indented paper.

The material of which the insulation is composed should be water-permeable, water-resistant and mildew-proof, and, when protected by a wrapping and retaining member as described above, should withstand the surging of water or steam therethrough. Loosely felted fibrous products, such as those consisting of an aeriformed felt of mineral wool, are not permanent under the conditions of alternate inundation and steaming. The term water-resistant is intended to mean durable and permanent in the presence of water. The insulating material may also be made water-repellent, as by the incorporation of aluminum stearate, a wax, and/or other waterproofing material applied in a usual manner.

In forming tubular insulation so that it may be applied conveniently around a pipe, the spirally wrapped sheets may be sawed through on one side, as indicated at 5, and scored on the opposite side, as indicated at 6, to leave a hinge-like union at the back about which the covering may be opened for insertion around a pipe that is to be insulated.

When the insulating layers have been so installed, there is placed around it a wrapping and retaining member 7. No member that is not readily permeable to water should be disposed between the insulating material and the retaining member 7. This member should be readily permeable to water, suitably foraminous, strong when wet, non-corrodible under the conditions of use, mildew-proof, and free from any large open spaces through which the insulation within the retaining member might be forced by steam pressure. A suitable type of retaining member is a woven wire fabric 7 of non-rusting metal, such as brass or copper. The wire of the fabric may be fine, as, for example, of diameter 0.008 inch. The mesh may be of various sizes, say, not larger than 4 meshes per linear inch and, suitably, 10 to 15 meshes per linear inch.

The wrapping and retaining member may include not only the woven wire fabric 7, but also a thermal insulating covering therefor, such as asbestos fibers. Thus, the member 7 may be asbestos cloth comprising asbestos yarns provided each with inner, reenforcing brass wires of the diameter stated above. Suitably, the warp threads in the asbestos fabric contain each two strands of the brass wire of the size stated, whereas the filler yarns contain only one.

The wrapping and the retaining member is fixed, securely and tightly, in position around the insulating layer by permanent fastening means 8, such as means containing non-corrodible, non-rusting, mildew-proof material.

Thus, there may be used copper wire stitching fastened through the wrapping 7 in such manner as to become engaged in the wire structure thereof.

As illustrated in the figure, the wrapping member is lapped on itself to form a longitudinal lap 9, into which the fastening means are engaged at close intervals, as, for example, at intervals of 1 to 3 inches apart, in order to prevent the insulation from being forced or blown out between the positions of engagement of the fastening means.

In order to minimize the failure of insulation at positions where the ends of adjacent sections abut, there is provided also a circumferential or end overlap 10 on one of the abutting sections. The end lap of the one section extends over the end of the adjoining section and is secured thereto by suitable means, as by copper wire fastening means 11 stitched in such manner as to hold the wrapper of one section firmly to the wrapper of the adjoining section.

An underground steam line, insulated as described, has a number of desirable features, some of which have been indicated in the preceeding description. The combination may be subjected to repeated inundation by water, followed by steaming, produced by high pressure steam passing through the steam line, without disruption or collapse of the insulating layer. Furthermore, the several wrappings of adjoining sections are so fastened together as to give a united wrapper adapted to protect insulation of a long length of steam line, without the introduction of any points of weakness.

The details that have been given are for the purpose of illustration and not restriction and many variations therefrom may be made without departing from the spirit and scope of the invention.

What I claim is:

1. A thermal insulating article, adapted to withstand occasional inundation followed by steaming, comprising juxtaposed sheets of water-permeable, water-resistant insulation, and a water-permeable, wrapping and retaining member that is strong when wet and that includes a wire-reenforced, woven asbestos fabric.

2. Tubular pipe covering including a water-permeable, water-resistant, thermal insulating layer, an encircling wrapper of the type of a wire-reenforced, woven asbestos fabric and mildew-proof, water-resistant fastening means holding the wrapper, at close intervals, securely around the insulating layer.

EARLE R. WILLIAMS.